(12) United States Patent
Harrison et al.

(10) Patent No.: US 10,462,422 B1
(45) Date of Patent: Oct. 29, 2019

(54) AUDIO SELECTION BASED ON USER ENGAGEMENT

(71) Applicant: Facebook, Inc., Menlo Park, CA (US)

(72) Inventors: Jason Francis Harrison, San Jose, CA (US); Shahid Razzaq, San Jose, CA (US); Eric W. Hwang, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/949,011

(22) Filed: Apr. 9, 2018

(51) Int. Cl.
*H04N 7/14* (2006.01)

(52) U.S. Cl.
CPC ................... *H04N 7/147* (2013.01)

(58) Field of Classification Search
CPC .. G01S 5/0072; G06F 17/3028; G06F 16/903; G06F 16/90335; G06F 17/15; H04L 12/18; H04L 63/102; H04L 63/105; H04L 65/403; H04L 65/4038; H04L 65/4084; H04L 65/4092; H04L 65/602; H04L 65/604; H04L 65/607; H04M 1/72572; H04M 2201/40; H04M 2250/52; H04M 3/4936; H04M 3/5191; H04N 2007/145; H04N 5/272; H04N 7/14; H04N 7/141; H04N 7/142; H04N 7/144; H04N 7/147; H04N 7/148; H04N 7/15; H04N 7/152; H04N 7/155; H04N 7/157; H04N 7/23206; H04W 4/18; H04W 4/185; G10K 11/175; G10K 11/178; G10K 2210/1282; G10K 2210/3032; G10K 2210/3033; G10K 2210/3056; H04R 1/00; H04R 1/1091;

(Continued)

(56) References Cited

U.S. PATENT DOCUMENTS

| | | | |
|---|---|---|---|
| 6,825,875 B1 * | 11/2004 | Strub | G11B 27/031 348/158 |
| 6,934,461 B1 * | 8/2005 | Strub | G11B 27/031 348/E7.088 |

(Continued)

FOREIGN PATENT DOCUMENTS

WO  WO 2012083989 A1  6/2012

OTHER PUBLICATIONS

International Search Report and Written Opinion for International Application No. PCT/US2019/025768, dated Jun. 21, 2019.

*Primary Examiner* — Khai N. Nguyen
(74) *Attorney, Agent, or Firm* — Baker Botts L.L.P.

(57) ABSTRACT

In one embodiment, a method includes receiving audio input data from a microphone array of at least two microphones. The audio input data is generated by a first sound source at a first location and a second sound source at a second location. The method also includes calculating a first engagement metric for the first sound source and a second engagement metric for the second sound source. The first engagement metric approximates an interest level of a receiving user for the first sound source, and the second engagement metric approximates an interest level from the receiving user for the second sound source. The method also includes determining that the first engagement metric is greater than the second engagement metric, and processing the audio input data to generate an audio output signal. The audio output signal may amplify sound generated by the first sound source relative to the second sound source.

17 Claims, 8 Drawing Sheets

(58) Field of Classification Search
CPC ............ H04R 2410/01; H04R 2410/05; G06N 3/0418; G06N 3/08; G06N 3/082
USPC ..... 181/210; 348/14.01, 14.02, 14.03, 14.04, 348/14.05, 14.06, 14.07, 14.08, 14.09, 348/14.1, 14.11, 14.12, 14.13, 14.14, 348/15.15, 14.16; 381/71.11, 71.14, 73.1, 381/86, 317; 382/275; 379/265.03; 455/414.1, 566; 701/36; 704/270
See application file for complete search history.

(56) References Cited

U.S. PATENT DOCUMENTS

| | | | | |
|---|---|---|---|---|
| 8,893,164 | B1* | 11/2014 | Teller | H04N 21/4307 725/12 |
| 9,098,576 | B1* | 8/2015 | Sharifi | G06F 17/3074 |
| 9,521,486 | B1* | 12/2016 | Barton | H04R 3/005 |
| 9,799,055 | B1* | 10/2017 | Rospo | G06Q 30/0607 |
| 9,805,125 | B2* | 10/2017 | Oztaskent | G06F 17/30867 |
| 9,838,759 | B2* | 12/2017 | Kirmse | H04N 21/2665 |
| 9,843,768 | B1* | 12/2017 | Negi | H04N 7/15 |
| 9,858,927 | B2* | 1/2018 | Williams | G10L 15/22 |
| 9,898,250 | B1* | 2/2018 | Williams | G06F 3/167 |
| 10,009,644 | B2* | 6/2018 | Aimone | A61B 5/0476 |
| 10,055,491 | B2* | 8/2018 | Tripoli | G06F 17/30023 |
| 2004/0257432 | A1* | 12/2004 | Girish | H04N 7/142 348/14.08 |
| 2005/0285541 | A1* | 12/2005 | LeChevalier | H01J 3/36 315/169.3 |
| 2010/0257234 | A1* | 10/2010 | Caughey | H04L 67/306 709/203 |
| 2011/0107369 | A1* | 5/2011 | O'Brien | G06F 17/30029 725/38 |
| 2012/0185769 | A1* | 7/2012 | Whitley | H04H 60/04 715/716 |
| 2012/0214515 | A1* | 8/2012 | Davis | H04W 4/023 455/456.3 |
| 2014/0028917 | A1* | 1/2014 | Smith | H04N 21/4312 348/564 |
| 2014/0047027 | A1* | 2/2014 | Moyers | H04L 51/04 709/204 |
| 2014/0118537 | A1* | 5/2014 | Weatherhead | H04H 60/45 348/135 |
| 2014/0156641 | A1* | 6/2014 | Tripoli | G06F 17/30023 707/722 |
| 2014/0176813 | A1* | 6/2014 | Conness | H04N 5/60 348/738 |
| 2014/0223462 | A1* | 8/2014 | Aimone | A61B 5/0476 725/10 |
| 2014/0236953 | A1* | 8/2014 | Rapaport | G06Q 10/10 707/740 |
| 2014/0280879 | A1* | 9/2014 | Skolicki | H04L 69/28 709/224 |
| 2015/0010169 | A1* | 1/2015 | Popova | H04S 7/303 381/107 |
| 2015/0039603 | A1* | 2/2015 | Alonso | G06Q 10/06 707/728 |
| 2015/0356836 | A1* | 12/2015 | Schlesinger | G08B 3/10 704/235 |
| 2015/0358730 | A1* | 12/2015 | Kirsch | H04R 3/002 381/71.1 |
| 2015/0365725 | A1* | 12/2015 | Belyaev | H04N 21/458 725/46 |
| 2015/0370435 | A1* | 12/2015 | Kirmse | H04N 21/2665 715/716 |
| 2015/0370902 | A1* | 12/2015 | Oztaskent | G06F 17/30867 707/770 |
| 2016/0080684 | A1* | 3/2016 | Farrell | H04N 9/8211 386/227 |
| 2016/0080874 | A1 | 3/2016 | Fullam | |
| 2016/0379261 | A1* | 12/2016 | Avalos | G06Q 30/0261 705/14.58 |
| 2017/0098457 | A1* | 4/2017 | Zad Issa | G10L 21/0388 |
| 2017/0134803 | A1* | 5/2017 | Shaw | H04N 21/4126 |
| 2017/0214954 | A1* | 7/2017 | Trollope | H04N 21/2668 |
| 2017/0221500 | A1 | 8/2017 | Glasgow | |
| 2017/0236512 | A1* | 8/2017 | Williams | G10L 15/22 381/79 |
| 2018/0032622 | A1* | 2/2018 | Oztaskent | G06F 17/30867 |
| 2018/0084312 | A1* | 3/2018 | Kirmse | H04N 21/2665 |

* cited by examiner

FIG. 4

AUDIO SELECTION BASED ON USER ENGAGEMENT

TECHNICAL FIELD

This disclosure generally relates to audio manipulation.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A smart communication device—such as a smartphone, tablet computer, laptop computer, or dedicated audio/video communication interface—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

An intelligent communication device may be used for audio/visual communications, such as live or video chats or pre-recorded audio/visual presentations. The intelligent communication device may have a "smart audio" component. The smart audio component may be able to distinguish between two or more sound sources and intelligently select which sound sources to amplify over the other sound sources. For example, during an audio-video communication session, a person may be talking in her living room and the television set may also be on and emitting sound. The smart audio component may be able to recognize the person's voice as a human voice and may be able to amplify the human voice over the TV noise. Such a distinction may not be limited to person-versus-TV situations. As an example and not by way of limitation, the smart audio component may be able to (1) distinguish between two or more different conversations that are occurring simultaneously in the same room, (2) gauge which conversation would be more interesting one or more receiving users (e.g., remote participants of the audio-visual communication session) by calculating engagement metrics for each conversation, and (3) relatively amplify the most interesting conversation (e.g., the conversation with the highest engagement metric) over the other conversations in the room for the receiving user. In particular embodiments, the smart audio component may not calculate an engagement metric but may instead follow other rules for determining which sound source to relatively amplify or dampen.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 4 illustrates an example visualization for sound location and selection.

DESCRIPTION OF EXAMPLE EMBODIMENTS

Figure 1:
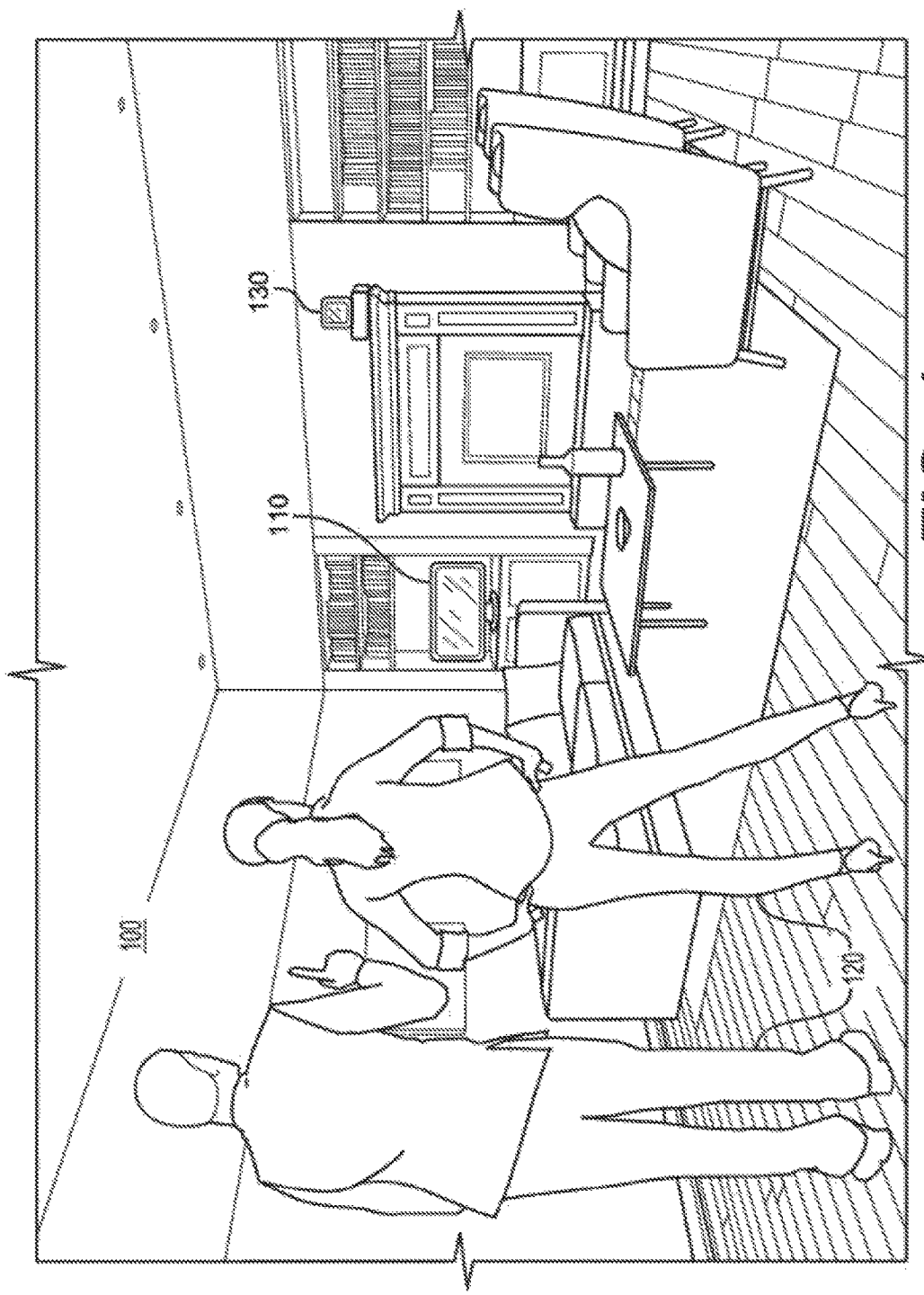
FIG. 1 illustrates an example intelligent communication device in an example living room setting.

An intelligent communication device may be used for audio/visual communications, such as live or video chats or pre-recorded audio/visual presentations. The intelligent communication device may have a "smart audio" component. The smart audio component may be able to distinguish between two or more sound sources and intelligently select which sound sources to amplify over the other sound sources. For example, during an audio-video communication session, a person may be talking in her living room and the television set may also be on and emitting sound. The smart audio component may be able to recognize the person's voice as a human voice and may be able to amplify the human voice over the TV noise. Such a distinction may not be limited to person-versus-TV situations. As an example and not by way of limitation, the smart audio component may be able to (1) distinguish between two or more different conversations that are occurring simultaneously in the same room, (2) gauge which conversation would be more interesting one or more receiving users (e.g., remote participants of the audio-visual communication session) by calculating engagement metrics for each conversation, and (3) relatively amplify the most interesting conversation (e.g., the conversation with the highest engagement metric) over the other conversations in the room for the receiving user. In particular embodiments, the smart audio component may not calculate an engagement metric, but may instead follow other rules for determining which sound source to relatively amplify or dampen. As an example and not by way of limitation, the smart audio component may have a rule that simply relatively amplifies the sounds emitted from the sound source that is closest to the intelligent communication device. Another rule may be to relatively amplify the sound that is associated with a subject (e.g., person or object) that is generating the most movement. For example, a child that is showing off her latest toy collection may be moving more than the other subjects in the environment, so the smart audio component may amplify the child's voice relative to other sounds in the environment. To accomplish the above examples, the smart computing device may perform the following steps: (1) receive, during an audio-visual communication session, audio input data from a microphone array comprising at least two microphones, wherein the audio input data is generated by a first sound source at a first location within an environment and a second sound source at a second location within the environment; (2) calculate a first engagement metric for the first sound source and a second engagement metric for the second sound source, wherein: the first engagement metric approximates an interest level from a receiving user for the first sound source; and the second engagement metric approximates an interest level from the receiving user for the second sound source; (3) determine that the first engagement metric is greater than the second engagement metric; (4) process the audio input data to generate an audio output signal, wherein the audio output signal relatively amplifies sound generated by the first sound source and relatively attenuates sound generated by the second sound source; and (5) send the audio output signal to a computing device associated with the receiving user.

FIG. 1 illustrates an example intelligent communication device 130 in an example environment 100. Note intelligent communication system 130 may also be referred to herein as client system 130, and these terms may be used interchangeably throughout this disclosure. Although FIG. 1 illustrates the example environment as a living room setting, this is merely an example of where the intelligent communication device may be located. It is contemplated that the intelligent communication device 130 may be located in any suitable setting indoors or outdoors, including the kitchen, bedrooms, hallways, backyards, parks, the beach, or any other environment. The environment 100 may include the intelligent communication device 130 and one or more sound generating sources, such as people 120, television 110. Other sound producing elements include radios, pets, household appliances such as vacuum cleaners, blenders, and garbage disposals. Sound producing elements may also include sources that are not inside or near the environment, such as emergency vehicle sirens, garbage trucks, and other such objects. The examples above can be considered point sources of sound i.e. originating from a certain point. Sound source may also be diffused or ambient i.e. coming from all direction e.g. general ambient sound in a cafeteria or city sounds if the device is placed outdoors. In particular embodiments, one or more computing components on the intelligent communication device 130 may receive, during an audio-visual communication session, audio input data from a microphone array comprising at least two microphones. The audio input data may be generated by a first sound source at a first location within the environment and a second sound source at a second location within the environment. As an example and not by way of limitation, the first sound source may be a person 120 who is located in front of intelligent communication device 130. The second sound source may be a television 130 that is located to the right of the intelligent communication device. Although this disclosure uses the example of a person and a television, as the sound sources, this disclosure contemplates any suitable sound source and combination of sound sources, such as multiple people who are talking over each other at the same time, a person and the radio, a person and children, a vacuum cleaner and the television, dogs and a person, or any other sound source and combination thereof.

Figure 2:
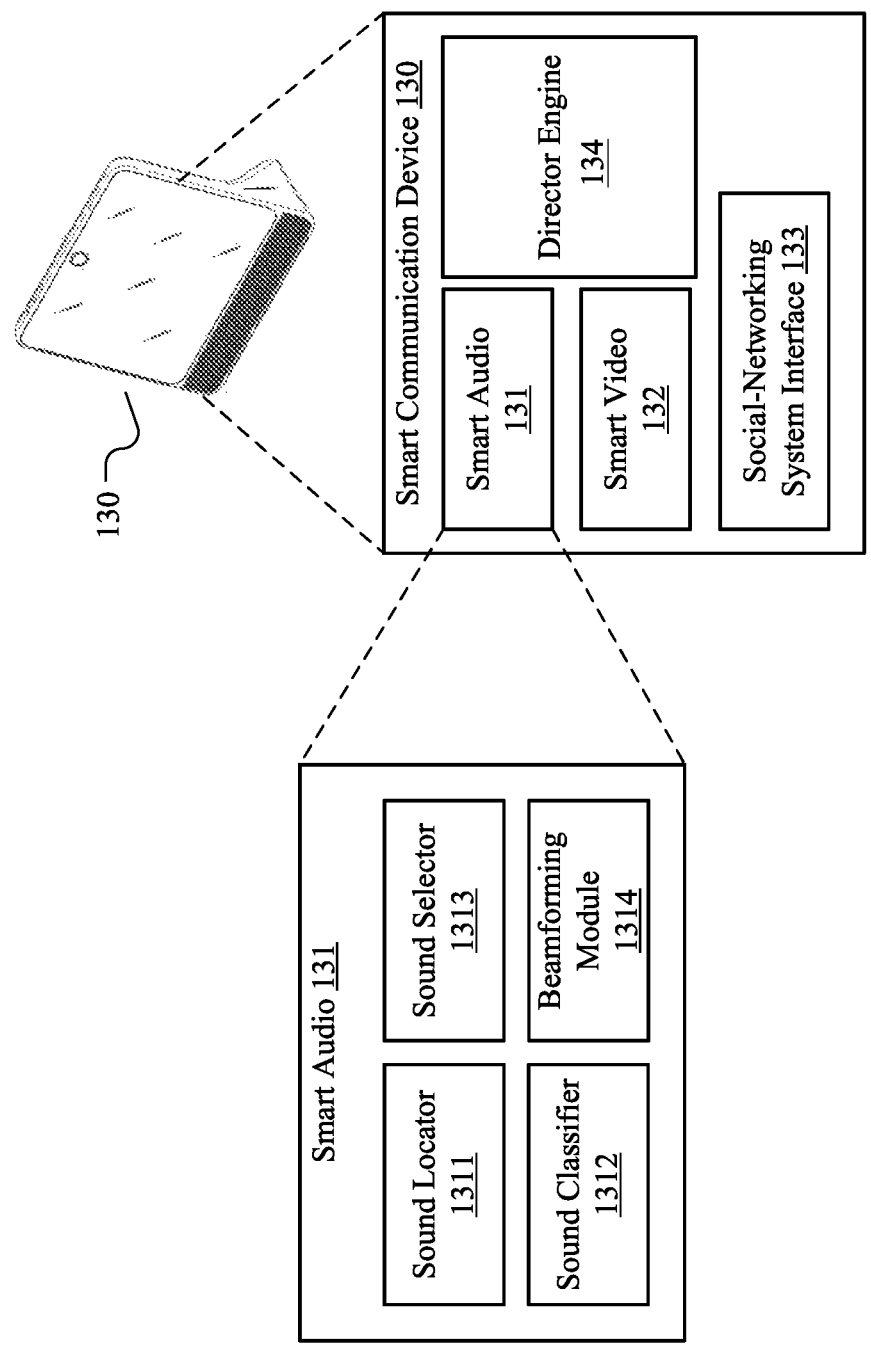
FIG. 2 illustrates an example intelligent communication device with example components.

FIG. 2 illustrates an example intelligent communication device 130 with example components. Example components include a smart audio component 131, a smart video component 132, a social-networking interface 133, and a director engine 134. Each of the components have or use the necessary processing and storage units to perform the functions discussed in this disclosure. Smart audio component 131 may itself comprise four modules: a sound locator 1311, a sound classifier 1312, a sound selector 1313, and a beamforming module 1314. Each of these modules may operate together to intelligently select sounds to amplify for a receiving user. As a step in this process, in particular embodiments, one or more processors associated with the intelligent communication device may calculate an engagement metric for each sound source in the environment. The engagement metric may approximate an interest level of a receiving user for the associated sound source. The engagement metric I of the receiving user for a given sound source i may be calculated by using the formula $I_i = Ax + By + \ldots Cz$, where $A, B, \ldots C$ are the features associated with the sound source and $x, y, z$ are weights that may be assigned to each respective feature. As an example and not by way of limitation, feature A may be the type of sound as determined by the sound classifier 1312. If the sound is a human voice, A may be assigned a feature value of 1. If the sound is non-human noise, A may be assigned a value of 0. The weight, x, assigned to A, may be any suitable weight. For example, the weight may be some value between 0 and 1. As a general rule, the more important the feature, the higher the weight may be. It is likely that the type of sound may be an important feature because the receiving user may almost always be more interested in listening to a human voice than non-human noise (e.g., garbage disposal, vacuum cleaner, radio, television); thus, x may be assigned a heavy weight relative to the other weights. For example, x may be assigned a weight of 0.75.

In particular embodiments, a third classification for the sound type may be whether the sound is reinforcing or not. A reinforcing sound may be a sound that adds to the atmosphere of the environment and increases the overall enjoyment of the receiving user. As an example and not by way of limitation, Ally and her mom Betsy may be participating in a live video chat and Ally may have a newborn baby. The baby may be fussing or crying. Ally's mom, Betsy would probably want to hear at least some of her grandbaby's fusses and cries during the conversation. Thus, the sounds emitted by the baby may be reinforcing, because they add to the experience of the video chat. Another example may be a video chat were a single user is on one end of the video chat, and a group of people are on the other end. For example, Ally may be having a birthday party with her friends and family, but Betsy may live too far away to attend the party, or she may be sick and unable to attend. At the party there may be lots of background noise from the party guests, there may be background music, and there may be other types of noises that are associated with birthday parties (e.g., laughing, singing, yelling). Betsy may likely be interested in hearing all of these background sounds because they add to the birthday party atmosphere. Thus, it may be undesirable for the smart audio component 131 to fully dampen all these noises, because that would take away from the ambiance of the video chat. Classifying a sound as reinforcing sound or as unwanted noise may be accomplished with contextual clues or historical information. Contextual clues may be the receiving user's engagement when the sound is emitted (e.g., when the baby cries and the receiving user looks down at the baby and smiles, that may be used to determine the crying baby is a reinforcing sound), information from a social graph of the user (e.g., the user's social graph indicates it is the user's birthday; thus the system may predict that a party may be held and may anticipate reinforcing sounds of people laughing and music playing), or any other suitable contextual clue.

In particular embodiments, the only feature in the engagement metric calculation may be the type of sound. Thus, in particular embodiments, the formula used by the smart audio component to calculate the engagement metric may be $I_i=Ax$. As an example and not by way of limitation, a user, Ally, may be having a video chat with her mom, Betsy, using the intelligent communication device. Ally may be the sending user and Betsy may be the receiving user. Note that both users are both sending and receiving users (as information is both sent and received during an audio-video communication session) but for the purposes of this discussion, Ally may be the sending user and Betsy may be the receiving user. There may be two sound sources in Ally's environment: Ally herself, and a television that is turned on. The smart audio component 131 may determine an engagement metric that Betsy would have toward (1) Ally's voice, and (2) the sound emitted from the television. To make the determination, the smart audio component 131 may first classify each sound using the sound classifier 1312. The sound classifier 1312 may classify Ally's voice as a human voice and may classify the television sound as non-human noise and not reinforcing. Sound classifier 1312 may make classifications by comparing the waveform's characteristics of each sound to pre-known waveform characteristics (e.g., particular non-identifying characteristics of Ally's voice may be matched with pre-known human voice characteristics), or by any other suitable method known by one having skill in the art of sound classification, including deep learning approaches. The smart audio component 131 may be programmed with a rule that instructs it to assign a high weight to human voice (e.g., 0.75) and a weight for non-human noise (e.g., 0.10). Thus, the engagement metric for Ally's voice may be 0.75 and the engagement metric for the television sound may be 0.10.

In particular embodiments, other features may include the distance between the intelligent communication device 130 and the sound source (with smaller distances being assigned a greater feature value), the location of the sound source relative to the intelligent communication device 130 (with sounds located in front of device 130 being assigned a greater weight), the social graph distance between users on either end of the video chat (with smaller social graph distances being assigned a greater weight), the amount of time a person has been present in the environment during the audio-video communication session, the amount of words a person has spoken during the audio-video communication session, and contextual clues. Contextual clues may be information obtained from the smart video component 132 or from the Director Engine 134, such as the direction that multiple people are looking. For example, if a majority of people in the room are looking toward the right side of the room, that may indicate that something interesting is happening at that part of the room. If there is a sound source at that part of the room, that sound source may be interesting as well. Thus, the engagement metric may be adjusted for that sound source accordingly. A binary question to ask in this regard may be "is the gaze of at least half the people in the environment directed toward the sound source?" If the answer is yes, then the smart audio component 131 may assign that feature a 1. Another example of a context clue may be a receiving user's facial expression while a particular sound source is emitting sound. As an example and not by way of limitation, two users, Ally and Betsy, are having a video chat with the intelligent communication device 130. Ally may be the sending user and Betsy may be the receiving user. The smart video component 132 may register facial expressions of Betsy while various sounds are emitted from Ally's environment. For example, Ally and Betsy may be having a conversation, and Ally's husband may enter the environment and interrupt the conversation to ask Ally a question. While Ally's husband is speaking, Betsy may look away from the intelligent communication device 130 to check her phone or tend to some other task. This looking away may indicate that Betsy is not particularly interested in what Ally's husband has to say. Thus, this may be an indication to the system to dampen the audio coming from Ally's husband unless he is actually participating in the conversation. Below is a table summary of the above features.

TABLE 1

Features for Engagement Metric Calculation

| Feature | How it affects the engagement metric |
| --- | --- |
| Classified as human sound | Human sound/voice → higher engagement metric |
| Is the sound reinforcing? | If yes → higher engagement metric |
| Distance between sound source and device 130 | Closer distance → higher engagement metric |
| Location relative to device 130 | In front of device 130 → higher engagement metric |
| Social graph distance between participants | $1^{st}$ degree connection → higher engagement metric; $2^{nd}$+ degree connection → lower engagement metric; |
| Time sound source has been present in the environment | Above a threshold time, (e.g., 10 minutes, 50% of video chat) → higher engagement metric |
| Number of words a person has spoken in the last n minutes. | Above a threshold number (e.g., 100 words or 30% of total words spoken by all participants) → higher engagement metric |

TABLE 1-continued

Features for Engagement Metric Calculation

| Feature | How it affects the engagement metric |
|---|---|
| Contextual Clues | Video suggests receiving is more engaged with a particular sound source → higher engagement metric. |

In particular embodiments, sound classifier 1312 or smart audio component 131 may access a descriptive model for the audio-video communication session. The descriptive model may include descriptive characteristics about (1) an environment associated with the current audio-video communication session; (2) one or more people within the environment, or (3) one or more contextual elements associated with the current audio-video communication session. The sound classifier 1312 may use information in the descriptive model to better classify the sound sources. As an example and not by way of limitation, a television that is emitting sounds should be classified as a non-human sound, even if the sounds are of human voices (e.g., a news reporter may be talking on the television). It may be difficult to distinguish between an actual human who is present in the environment and is talking, and a television who is emitting sound of a human talking. However, the descriptive model may include information about the people in the room. The information may include their identities, their locations in the environment, and various other social networking information. The sound classifier 1312 may optionally use this information to determine whether a sound source is a human voice or not. As an example and not by way of limitation, the television may be located in one sector of the environment, and it may be playing a man who is talking. Using only audio data it may be difficult to determine whether this sound is a human voice or a television sound. However, using video data captured in the descriptive model, it may be easily apparent that a person is not standing in the same sector as the television. Thus, to aid in the classification, the sound classifier 1312 may access this information and make a determination that because a television is located in the same sector as the sound source and no person is also located in that sector, the sound source is not a human voice.

Figure 3:
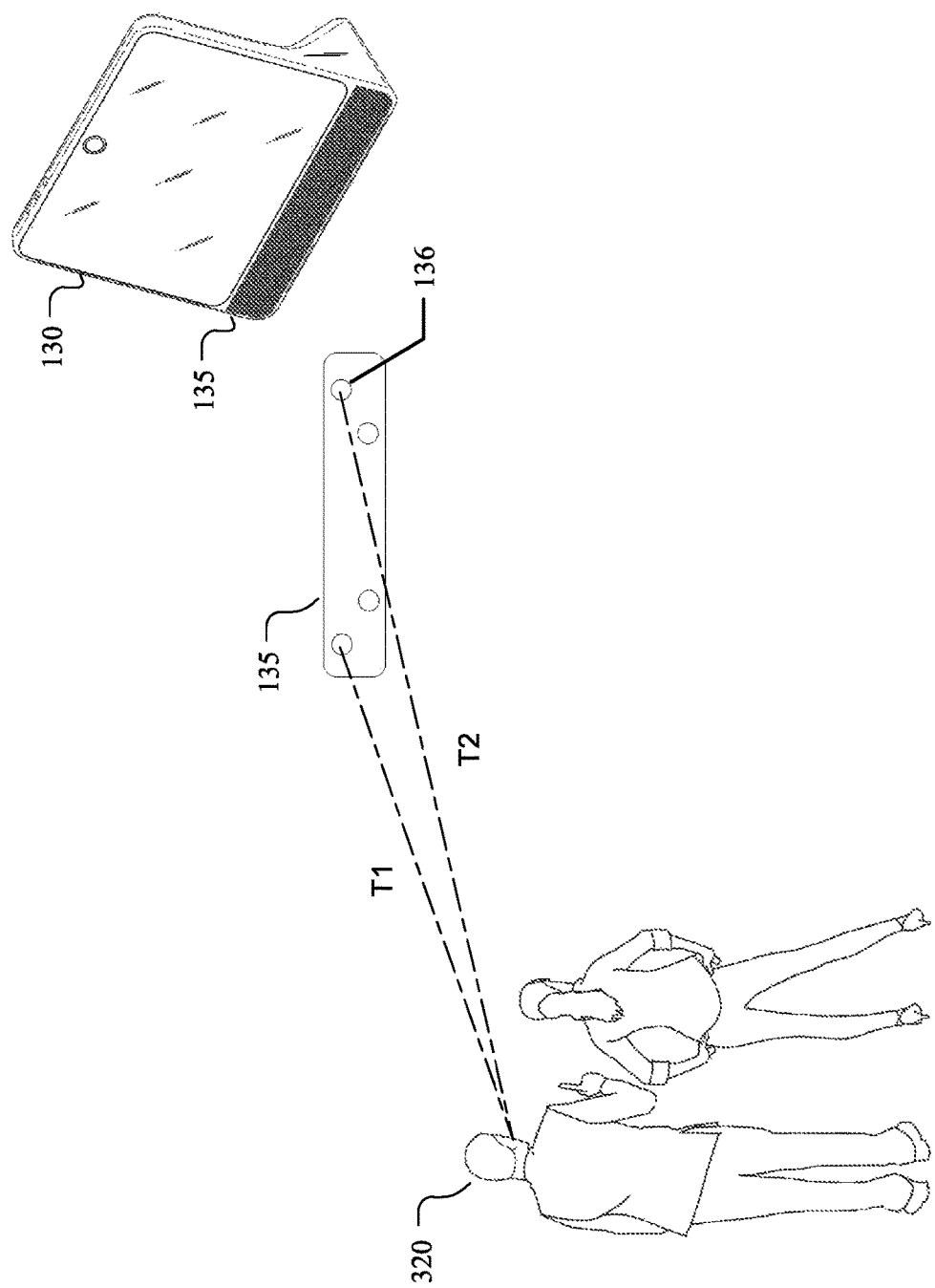
FIG. 3 illustrates an example sound location diagram.

FIG. 3 illustrates an example sound location diagram. The intelligent communication device 130 may include a microphone/speaker section 135. The microphone/speaker section may include two or more microphones 136 as well as a suitable number of speakers (not shown in FIG. 3). FIG. 3 illustrates four microphones 136 arranged in a trapezoid configuration. This configuration may be for determining both the horizontal and vertical direction of the sound source. Determining the direction of the sound source may be accomplished my measuring the difference between the time when the sound reaches the first microphone and the time when the same sound from the same source reaches the second microphone. From this time difference, the sound locator module 1311 may be able to locate the direction of the sound source using geometry. In the example of FIG. 3, sound locator module 1311 may be able to determine the direction of the person 320 by using the difference between time of arrival T1 and T2 to calculate the angle of each incoming sound source and ultimately the direction of person 120 based on the incoming sound signals.

Figure 4:
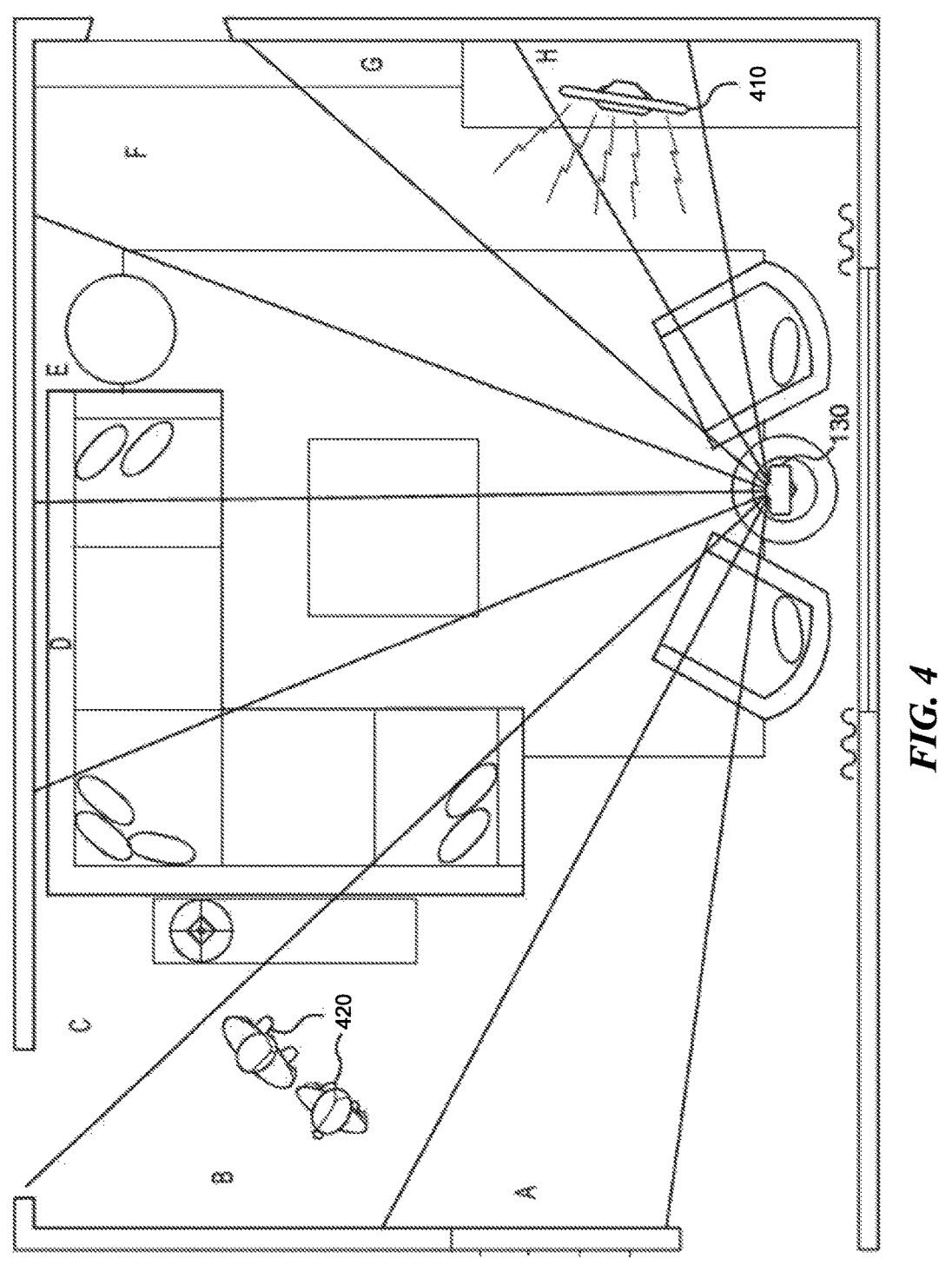

FIG. 4 illustrates an example visualization for sound location and selection. In particular embodiments, the intelligent communication device 130 (optionally via smart audio component 131) may divide its environment up into several "sound slices." In the example illustrated, there are eight sound slices A through H, but this disclosure contemplates any suitable number of sound slices. The smart audio component 131 may use the sound locator 1311 to determine which sound slice each audio source is coming from. As an example and not by way of limitation, two people 420 may be having a conversation in sound slice B and a television set 410 may be playing in sound slice H. Each of people 420 and television 410 may be emitting sound simultaneously. The smart audio component 131 may identify both of these sound sources and determine which slice they are currently located in. In particular embodiments, a sound source may occupy more than one sound slice. For example, a person may be straddling slices C and D. In this case, the smart audio component may be able to determine that the sound and visual object (e.g., person) may be located at the edge of slice C and slice D.

The smart audio component 131 may also calculate a first engagement metric for the first sound source associated with the two people 420. The smart audio component 131 may also calculate a second engagement metric for the second sound source associated with the television 410. The engagement metric calculation may consider three features: (1) human voice; (2) social graph distance; and (3) location of sound source relative to the intelligent communication device 130. The above features may be weighted 0.75, 0.50, and 0.25 respectively. For the purposes of this example calculation, assume that: (1) one of the two people has a high affinity coefficient with the receiving user in the social graph (affinity coefficients are discussed below with reference to FIG. 7); (2) the television is playing an NCAA Basketball game between Ohio State and Michigan, and the receiving user's social graph indicates that she attended Michigan for college; and (3) the television 410 is located at a more extreme angle relative to the intelligent communication device 130 than the people 420 (as illustrated in FIG. 4). The engagement metric for the conversation in slice B may be represented as $I_B=Ax+By+Cz$ and the engagement metric for the television sound in slice H may be $I_H=Ax+By+Cz$. For the conversation, $I_B=(1)(0.75)+(1)(0.50)+(1)(0.25)=1.5$. This may be because the sound classifier 1312 may have classified the conversation and being human voice and the smart audio component may have accordingly assigned feature "A" a score of 1; one of the people 420 is a first-degree connection to the receiving user, so "B" may also receive a score of 1. And slice B is located more in front of the intelligent communication device 130 than the television 410, so "C" may also receive a score of 1. For the television set, the engagement metric may be calculated as $I_H=(0)(0.75)+(1)(0.50)+(0)(0.25)=0.5$. This may be because the television sound is not classified as human, so A may be assigned "0." Since Becky attended Michigan University, she may have a strong affinity (e.g., above a threshold affinity) for Michigan Basketball. And since there is a Michigan game playing on the television, B may be assigned "1." The intelligent director may have determined that a Michigan basketball came was playing on the television either through image/audio recognition or by accessing an online television guide. Lastly, since the television is located at a very extreme angle relative to the intelligent communication device 130, C may be assigned "0." Because the conversation in slice B has a higher engagement metric, the smart audio component 131 may determine to amplify the conversation between people 420 and dampen the sound coming from the television 410.

In particular embodiments, the smart audio component 131 may increase the engagement metric for a given sound source based on information included in a social graph associated with the receiving user. As discussed below, the social graph may include nodes and edges connecting the nodes. Each edge connecting two nodes may represent a relationship between the two nodes. For example, if a first user, Alex, attended college at Baylor University, the social graph may have a first node corresponding to Alex (or to Alex's profile on the online social network) and a second node corresponding Baylor University (or to an online resource for Baylor University). The social graph may additionally have an edge connection between the first node and the second node. The edge connection may have an edge type. The edge type may be "attended." Additionally, there may be other edges between Alex's node and the node for Baylor University, if Alex has performed other actions on the online social network with regard to Baylor University. For example, Alex may have liked the Baylor University entity page on the online social network. This may have generated another edge connection with an edge type of "like" between the first node and the second node. Watching videos associated with Baylor University, commenting, joining groups, and other similar actions may all add edge connections between Alex's node and the node for Baylor University. These actions may also serve to increase an affinity coefficient between Alex and Baylor University, as is discussed below. The smart audio component 131 may access the social graph and may increase the engagement metric based on the affinity or edge between the user and a given entity. To continue the above example, Alex may be participating in a video chat with another user such as people 420 of FIG. 4. The television 410 may be playing a Baylor Football game. The smart audio component 131 may have determined that a Baylor Football game is playing on television 410 by recognizing sounds (e.g., the TV may play the words "welcome back to Baylor Football"), or by accessing a television guide and the current channel of the television, or by any other suitable means. The smart audio component 131 may access a social graph for Alex and may determine that a high affinity coefficient exists between Alex and Baylor University, and specifically, for Baylor Football. Based on this determination, the smart audio component 131 may increase the engagement metric for the sound source of the television 410, because it is more likely that Alex would be interested in watching the football game.

In particular embodiments, the receiving user may be able to override the determination made by the smart audio component 131 by tapping on the screen of the receiving device (which may be an intelligent communication device 130 or may be a different mobile computing device such as a smart phone, tablet, or laptop computer). For example, the receiving user in the above example in relation to FIG. 4 may be very interested in watching and hearing the basketball game between The Ohio State University and Michigan University. To amplify the television sound in slice H over the conversation in slice B, the user may tap on her intelligent communication device 130 (which may be the receiving device for the purposes of this discussion) over the television set 410. The smart audio component 131 may be able to adjust to this type of user input and amplify the sound of the television 410 and dampen the sound of the conversation between people 420. In particular embodiments, the user action of tapping on a source may be recorded and stored either locally on the intelligent computing device, or in association with a user's social graph on a remote server. For example, the action may strengthen the affinity between the user and the sound source. The smart audio component may access this information in future communication sessions and may use it to decide which sound source to amplify relative to other sound sources.

In particular embodiments, the video component and the audio component need not be tightly coupled. The intelligent communication device 130 may de-couple the audio from the video. This may allow a receiving user to view one object and listen to a different sound source. As an example and not by way of limitation, the receiving user in the above example may be able to listen to the conversation happening in slice B but may be able to watch the game that is on television 410 in slice H. The user may be able to select to view this through any suitable user settings configuration, including voice commands. The intelligent communication device 130 may also be able to infer the user's desire to view one object and listen to a different sound source. This may be accomplished using any suitable means, including user preference settings. For example, an icon for video and an icon for audio may be provided. The user may select video and tap on a subject to be the video target. The user may then select audio and tap on a different subject to be the audio target. This may work well with a user who wants to view a particular subject (e.g., a newborn baby) but talk to a different subject (e.g., the newborn baby's parents).

In particular embodiments, the smart audio component 131 may be configured to personalize the audio for the receiving user. The smart audio component 131 may access a social graph of the receiving user and use that data to make personalized audio decisions for the receiving user. The smart audio component 131 may generally amplify sounds that are associated with entities or objects that the user has a high affinity towards. As an example and not by way of limitation, consider the example of Betsy having a video chat with her daughter Ally and Ally's children (Betsy's grandchildren). The smart audio component 131 may detect sounds coming from Ally's children, which may be located in another horizontal or vertical sector than Ally. In a normal video chat session, sounds coming from young children may be attenuated because they likely are not interesting to the receiving viewer. But because Betsy may have a strong affinity for her grandchildren (which may be determined from Betsy's social graph (e.g., by Betsy liking photos of her grandchildren and commenting on the photos)), the sounds coming from the grandchildren may not be attenuated. They may even be amplified over the sounds coming from Ally, if the smart audio component 131 infers that Betsy is more interested in hearing the grandchildren than hearing Ally at a given time. In particular embodiments, users may choose to mute participants, including themselves. For example, if Betsy is talking to one of the grandkids, Ally may choose to mute herself while she talks to another friend on her cell phone. Ally may do this by making the appropriate selections on the intelligent communication device 130.

In particular embodiments, one or more processors associated with the intelligent communication device 130 may process the audio input data to generate an audio output signal. The audio output signal may amplify the sound generated by the sound source that has the higher engagement metric. This may be accomplished by beamforming module 1314. Acoustic beamforming may refer to time-delaying two or more audio signals to generate either constructive interference, destructive interference, or both. Out-of-phase audio signals cancel each other out. In-phase signals add together and become amplified. The smart audio component 131 may use a microphone array (such as for example the microphone array formed by microphones 136) to extract desired speech signals in a noisy environment by beamforming the audio signals from the microphones to amplify some sounds and attenuate other sounds. For example, acoustic beamforming may be used to amplify the sound of a single person's voice in a noisy room full of people who are all talking at the same time. In particular embodiments, acoustic beamforming may be accomplished using a time-delay beamformer, a Frost beamformer, or any other suitable beamformer or beamforming technique. As an example and not by way of limitation, with reference to FIG. 4, the smart audio component 131 may determine that the sounds emitted by people 420 in slice B has a higher engagement metric than the sounds emitted by the television 410 in slice H. Each microphone 136 may generate its own audio signal. To amplify the sounds emitted from slice B of FIG. 4, the smart audio component 131 may selectively overlap or time-delay the audio signal from each microphone 136 for the output audio signal such that the appropriate sound source is amplified relative to the other sound sources. Note that amplifying a first sound relative to a second sound may be accomplished by maintaining the volume of the first sound and lowering the volume of the second. and the other sound source is dampened. Although this disclosure describes amplifying one sound source and dampening one sound source, this disclosure contemplates amplifying any number of sound sources as well as dampening any number of sound sources. In particular embodiments, once the sound signal has been generated, it may be sent to the receiving unit to be played for the receiving user. This disclosure contemplates that the amplification/dampening processing (or any other processing such as the engagement metric calculation) may be done on the sending unit (e.g., intelligent communication device 131 of the sending user), the receiving unit (e.g., intelligent communication device 131 of the receiving user, or a different suitable mobile device of the receiving user such as a smart phone or tablet), on a remote server associated with the social-networking system (e.g., server 662 of social-networking system 660), or any other suitable location.

In particular embodiments, smart audio component 131 may "sound bias" the sound emitted from the device 130 on the receiving user's end. This sound bias may have the purpose of creating a more realistic sound landscape of the environment in which the sending device is located. To sound bias audio, the smart audio component 131 may selectively direct the sound emitted from the speakers of the intelligent communication device 130 so as to imitate the sound gathered at the microphone. As an example and not by way of limitation, a sending intelligent communication device 130 may be positioned in a sending user's living room in Fort Worth, Tex. In addition, a receiving intelligent communication device 130 may be positioned in a receiving user's living room in Los Angeles, Calif. (Note that both devices 130 may send and receive data during a video chat so both devices may be properly referred to as both sending and receiving, but for the purposes of this discussion, it is assumed that one device is the sending device and the other device is the receiving device). To continue the example, a person may speak or shout into the sending user's living room from the left of the intelligent communication device, so that the intelligent communication device 130 picks up the sound as being generated from its left. When that sound is emitted on the receiving device's end at the receiver's living room, the sound signal may be directed to appear as if it were generated to the left of the receiving device 130. This may enhance the user's experience.

In particular embodiments, the smart audio component may be configured to provide one or more effects to the sounds in the environment. The effects may be a sound altering algorithm applied to one of the sounds. As an example and not by way of limitation, a person's voice may be altered so that the person sounds like he just inhaled helium (e.g., a higher-pitched "chipmunk" effect). To apply an effect to a participant's voice, the participant may tap an appropriate voice altering icon on the display screen of the intelligent communication device. In particular embodiments, a first user may be able to apply a voice-altering effect to a second user's voice by tapping on the representation of the second user on the display screen, and then selecting an appropriate voice-altering icon. As a result, only the selected user's voice may be altered. Optionally, all the users may have different voice-altering effects applied to their voices. The system may save user preferences for audio effects to be applied to certain types of social interactions (e.g. an uncle might always want to have the helium effect for his niece, and may invoke the audio effect every time it detects the two interacting).

Figure 5:
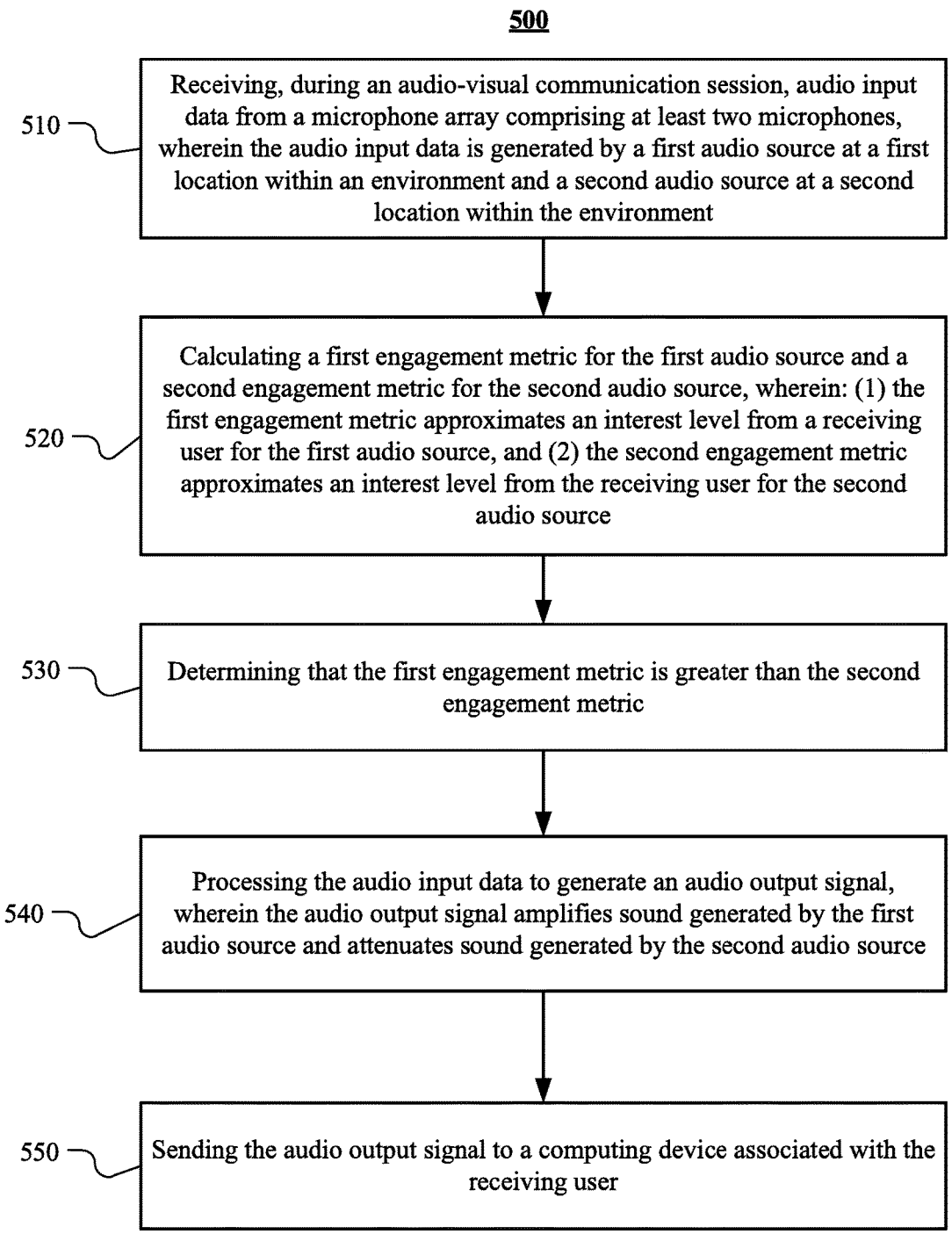
FIG. 5 illustrates an example method for selecting and amplifying a particular sound source.

FIG. 5 illustrates an example method 500 for selecting and amplifying a particular sound source. The method may begin at step 510, where a computing device may receive, during an audio-visual communication session, audio input data from a microphone array comprising at least two microphones, wherein the audio input data is generated by a first sound source at a first location within an environment and a second sound source at a second location within the environment. At step 520, the computing device may calculate a first engagement metric for the first sound source and a second engagement metric for the second sound source, wherein: the first engagement metric approximates an interest level of a receiving user for the first sound source; and the second engagement metric approximates an interest level from the receiving user for the second sound source. At step 530, the computing device may determine that the first engagement metric is greater than the second engagement metric. At step 540, the computing device may process the audio input data to generate an audio output signal, wherein the audio output signal amplifies sound generated by the first sound source and attenuates sound generated by the second sound source. At step 550, the computing device may send the audio output signal to a computing device associated with the receiving user. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for selecting and amplifying a particular sound source including the particular steps of the method of FIG. 5, this disclosure contemplates any suitable method for selecting and amplifying a particular sound source including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
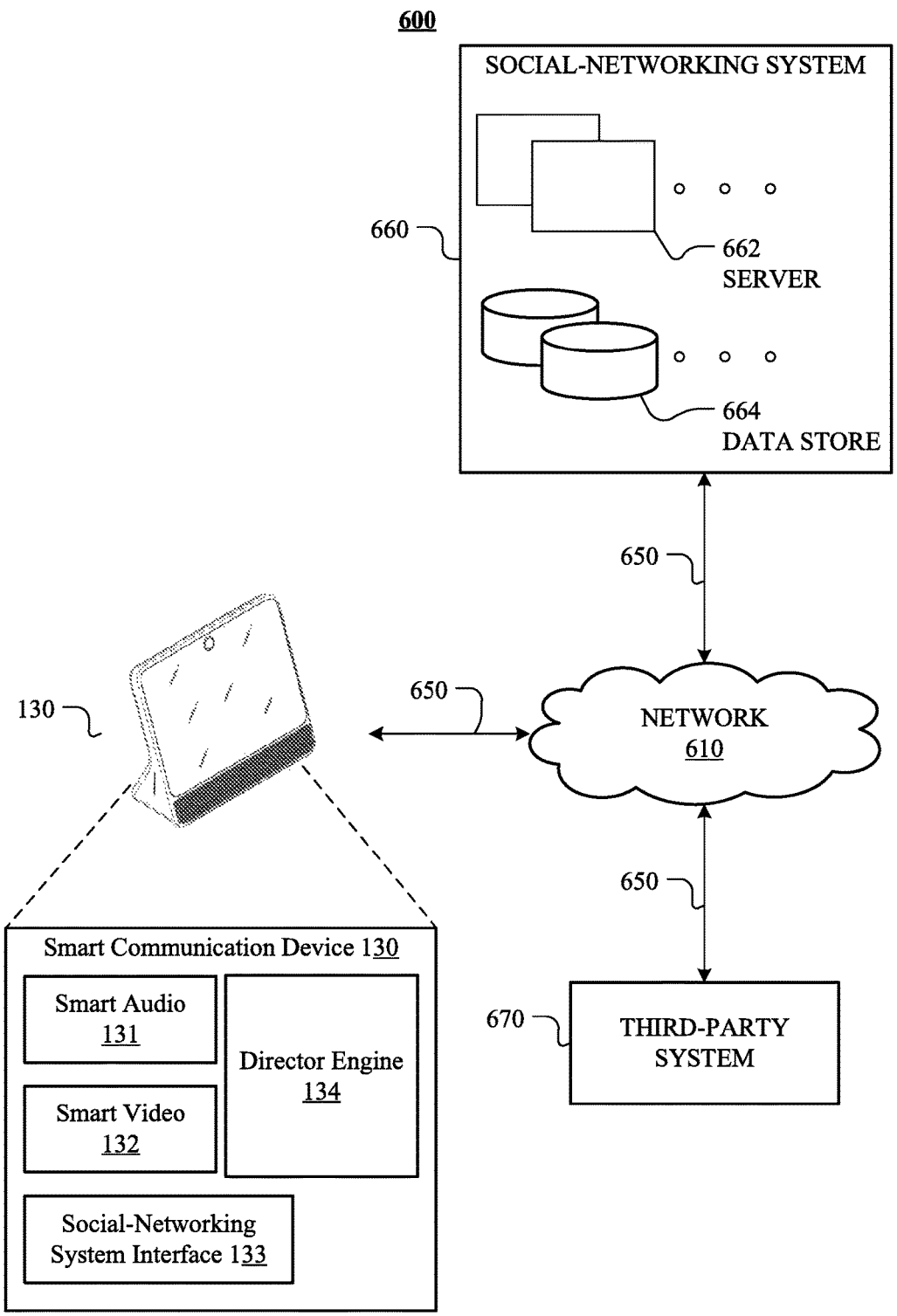
FIG. 6 illustrates an example network environment associated with a social-networking system.

FIG. 6 illustrates an example network environment 600 associated with a social-networking system. Network environment 600 includes a client system 130, a social-networking system 660, and a third-party system 670 connected to each other by a network 610. Note that client system 130 may be the same as intelligent communication device 130, and these terms may be used interchangeably throughout this disclosure. Although FIG. 6 illustrates a particular arrangement of client system 130, social-networking system 660, third-party system 670, and network 610, this disclosure contemplates any suitable arrangement of client system 130, social-networking system 660, third-party system 670, and network 610. As an example and not by way of limitation, two or more of client system 130, social-networking system 660, and third-party system 670 may be connected to each other directly, bypassing network 610. As another example, two or more of client system 130, social-networking system 660, and third-party system 670 may be physically or logically co-located with each other in whole or in part. Moreover, although FIG. 6 illustrates a particular number of client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple client system 130, social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 130, social-networking system 660, and third-party system 670 to communication network 610 or to each other. This disclosure contemplates any suitable links 650. In particular embodiments, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 630. A client system 130 may enable a network user at client system 130 to access network 610. A client system 130 may enable its user to communicate with other users at other client systems 630.

In particular embodiments, client system 130 may include a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 660 may be a network-addressable computing system that can host an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 610. As an example and not by way of limitation, client system 130 may access social-networking system 660 using a web browser 632, or a native application associated with social-networking system 660 (e.g., a mobile social-networking application, a messaging application, another suitable application, or any combination thereof) either directly or via network 610. In particular embodiments, social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, social-networking system 660 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 660, or a third-party system 670 to manage, retrieve, modify, add, or delete, the information stored in data store 664.

In particular embodiments, social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. Social-networking system 660 may provide users of the online social network the ability to communicate and interact with other users. In particular embodiments, users may join the online social network via social-networking system 660 and then add connections (e.g., relationships) to a number of other users of social-networking system 660 to whom they want to be connected. Herein, the term "friend" may refer to any other user of social-networking system 660 with whom a user has formed a connection, association, or relationship via social-networking system 660.

In particular embodiments, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-networking system 660 and coupled to social-networking system 660 via a network 610.

In particular embodiments, social-networking system 660 may be capable of linking a variety of entities. As an example and not by way of limitation, social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking system 660. In particular embodiments, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 660 also includes user-generated content objects, which may enhance a user's interactions with social-networking system 660. User-generated content may include anything a user can add, upload, send, or "post" to social-networking system 660. As an example and not by way of limitation, a user communicates posts to social-networking system 660 from a client system 130. Posts may include data such as status updates or other textual data, location information, photos, videos, links, music or other similar data or media. Content may also be added to social-networking system 660 by a third-party through a "communication channel," such as a newsfeed or stream.

In particular embodiments, social-networking system 660 may include a variety of servers, sub-systems, programs, modules, logs, and data stores. In particular embodiments, social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular embodiments, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 630 or one or more third-party system 670 via network 610. The web server may include a mail server or other messaging functionality for receiving and routing messages between social-networking system 660 and one or more client systems 630. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 660. A privacy setting of a user determines how particular information associated with a user can be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Figure 7:
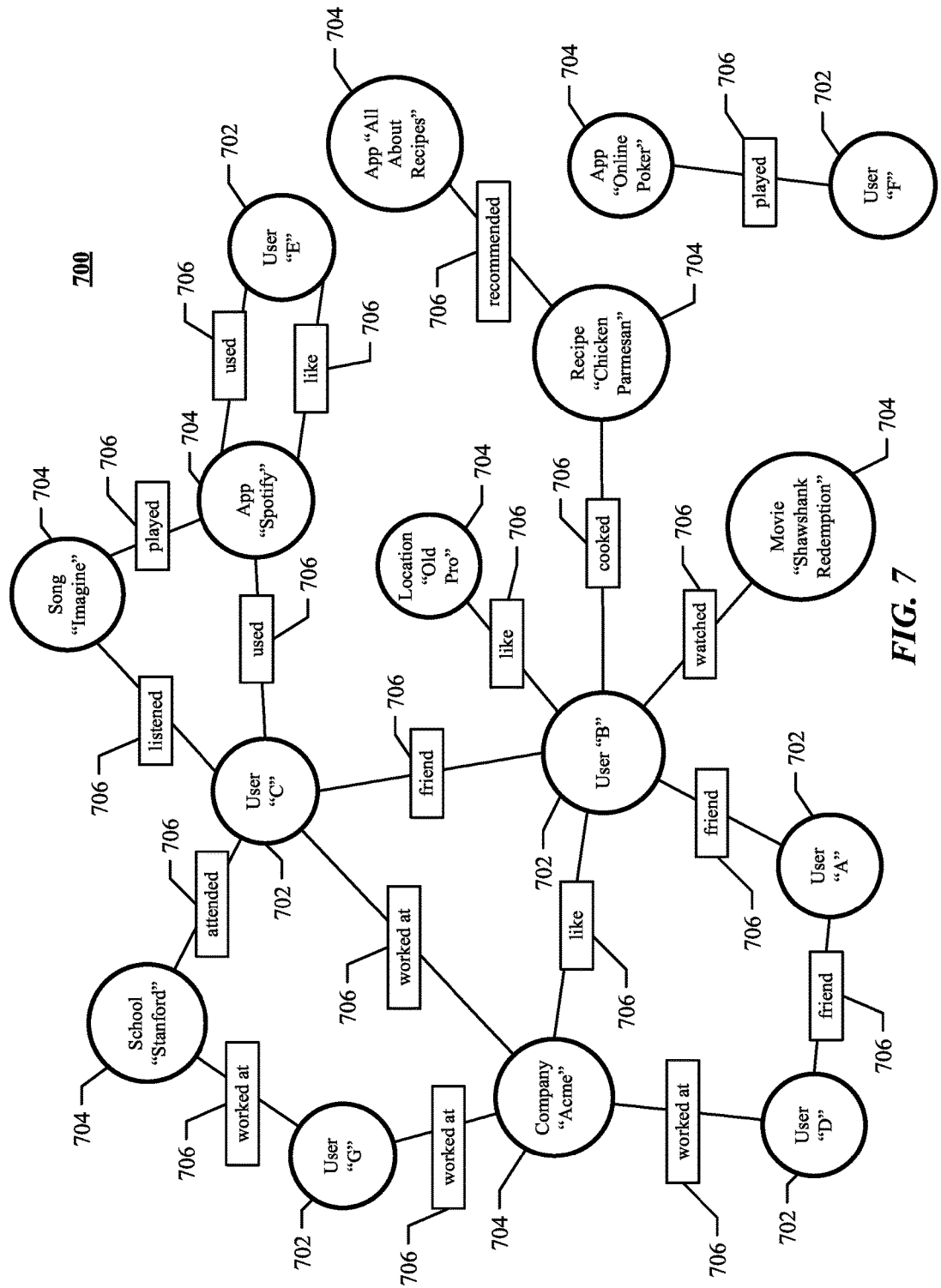
FIG. 7 illustrates an example social graph.

FIG. 7 illustrates example social graph 700. In particular embodiments, social-networking system 660 may store one or more social graphs 700 in one or more data stores. In particular embodiments, social graph 700 may include multiple nodes—which may include multiple user nodes 702 or multiple concept nodes 704—and multiple edges 706 connecting the nodes. Example social graph 700 illustrated in FIG. 7 is shown, for didactic purposes, in a two-dimensional visual map representation. In particular embodiments, a social-networking system 660, client system 130, or third-party system 670 may access social graph 700 and related social-graph information for suitable applications. The nodes and edges of social graph 700 may be stored as data objects, for example, in a data store (such as a social-graph database). Such a data store may include one or more searchable or queryable indexes of nodes or edges of social graph 700.

In particular embodiments, a user node 702 may correspond to a user of social-networking system 660. As an example and not by way of limitation, a user may be an individual (human user), an entity (e.g., an enterprise, business, or third-party application), or a group (e.g., of individuals or entities) that interacts or communicates with or over social-networking system 660. In particular embodiments, when a user registers for an account with social-networking system 660, social-networking system 660 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with social-networking system 660. In particular embodiments, a user node 702 may be associated with information provided by a user or information gathered by various systems, including social-networking system 660. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more webpages.

In particular embodiments, a concept node 704 may correspond to a concept. As an example and not by way of limitation, a concept may correspond to a place (such as, for example, a movie theater, restaurant, landmark, or city); a website (such as, for example, a website associated with social-network system 660 or a third-party website associated with a web-application server); an entity (such as, for example, a person, business, group, sports team, or celebrity); a resource (such as, for example, an audio file, video file, digital photo, text file, structured document, or application) which may be located within social-networking system 660 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 704 may be associated with information of a concept provided by a user or information gathered by various systems, including social-networking system 660. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more webpages.

In particular embodiments, a node in social graph 700 may represent or be represented by a webpage (which may be referred to as a "profile page"). Profile pages may be hosted by or accessible to social-networking system 660. Profile pages may also be hosted on third-party websites associated with a third-party system 670. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular embodiments, a concept node 704 may represent a third-party webpage or resource hosted by a third-party system 670. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 660 a message indicating the user's action. In response to the message, social-networking system 660 may create an edge (e.g., a check-in-type edge) between a user node 702 corresponding to the user and a concept node 704 corresponding to the third-party webpage or resource and store edge 706 in one or more data stores.

In particular embodiments, a pair of nodes in social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, social-networking system 660 may send a "friend request" to the second user. If the second user confirms the "friend request," social-networking system 660 may create an edge 706 connecting the first user's user node 702 to the second user's user node 702 in social graph 700 and store edge 706 as social-graph information in one or more of data stores 664. In the example of FIG. 7, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706. The degree of separation between two objects represented by two nodes, respectively, is a count of edges in a shortest path connecting the two nodes in the social graph 700. As an example and not by way of limitation, in the social graph 700, the user node 702 of user "C" is connected to the user node 702 of user "A" via multiple paths including, for example, a first path directly passing through the user node 702 of user "B," a second path passing through the concept node 704 of company "Acme" and the user node 702 of user "D," and a third path passing through the user nodes 702 and concept nodes 704 representing school "Stanford," user "G," company "Acme," and user "D." User "C" and user "A" have a degree of separation of two because the shortest path connecting their corresponding nodes (i.e., the first path) includes two edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to an edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, social-networking system 660 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 660 may create a "listened" edge 706 and a "used" edge (as illustrated in FIG. 7) between user nodes 702 corresponding to the user and concept nodes 704 corresponding to the song and application to indicate that the user listened to the song and used the application. Moreover, social-networking system 660 may create a "played" edge 706 (as illustrated in FIG. 7) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704 for "SPOTIFY").

In particular embodiments, social-networking system 660 may create an edge 706 between a user node 702 and a concept node 704 in social graph 700. As an example and not by way of limitation, a user viewing a concept-profile page (such as, for example, by using a web browser or a special-purpose application hosted by the user's client system 130) may indicate that he or she likes the concept represented by the concept node 704 by clicking or selecting a "Like" icon, which may cause the user's client system 130 to send to social-networking system 660 a message indicating the user's liking of the concept associated with the concept-profile page. In response to the message, social-networking system 660 may create an edge 706 between user node 702 associated with the user and concept node 704, as illustrated by "like" edge 706 between the user and concept node 704. In particular embodiments, social-networking system 660 may store an edge 706 in one or more data stores. In particular embodiments, an edge 706 may be automatically formed by social-networking system 660 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

In particular embodiments, social-networking system 660 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 670 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 660 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 660 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 660 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 660 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 660 may calculate a coefficient based on a user's actions. Social-networking system 660 may monitor such actions on the online social network, on a third-party system 670, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 660 may calculate a coefficient based on the user's actions with particular types of content. The content may be associated with the online social network, a third-party system 670, or another suitable system. The content may include users, profile pages, posts, news stories, headlines, instant messages, chat room conversations, emails, advertisements, pictures, video, music, other suitable objects, or any combination thereof. Social-networking system 660 may analyze a user's actions to determine whether one or more of the actions indicate an affinity for subject matter, content, other users, and so forth. As an example and not by way of limitation, if a user frequently posts content related to "coffee" or variants thereof, social-networking system 660 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 660 may calculate a coefficient based on the type of relationship between particular objects. Referencing the social graph 700, social-networking system 660 may analyze the number and/or type of edges 706 connecting particular user nodes 702 and concept nodes 704 when calculating a coefficient. As an example and not by way of limitation, user nodes 702 that are connected by a spouse-type edge (representing that the two users are married) may be assigned a higher coefficient than a user nodes 702 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 660 may determine that the user has a higher coefficient with respect to the first photo than the second photo because having a tagged-in-type relationship with content may be assigned a higher weight and/or rating than having a like-type relationship with content. In particular embodiments, social-networking system 660 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 660 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 700. As an example and not by way of limitation, social-graph entities that are closer in the social graph 700 (i.e., fewer degrees of separation) may have a higher coefficient than entities that are further apart in the social graph 700.

In particular embodiments, social-networking system 660 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 660 may determine that the user has a higher coefficient for the airport than the gas station based on the proximity of the airport to the user.

In particular embodiments, social-networking system 660 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 660 may provide information that is relevant to user's interests and current circumstances, increasing the likelihood that they will find such information of interest. In particular embodiments, social-networking system 660 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 660 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 660 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 670 (e.g., via an API or other communication channel), or from another suitable system. In response to the request, social-networking system 660 may calculate the coefficient (or access the coefficient information if it has previously been calculated and stored). In particular embodiments, social-networking system 660 may measure an affinity with respect to a particular process. Different processes (both internal and external to the online social network) may request a coefficient for a particular object or set of objects. Social-networking system 660 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 660, a client system 630, a third-party system 670, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 704 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 660 or shared with other systems (e.g., a third-party system 670). Although this disclosure describes using particular privacy settings in a particular manner, this disclosure contemplates using any suitable privacy settings in any suitable manner.

In particular embodiments, privacy settings may be based on one or more nodes or edges of a social graph 700. A privacy setting may be specified for one or more edges 706 or edge-types of the social graph 700, or with respect to one or more nodes 702, 704 or node-types of the social graph 700. The privacy settings applied to a particular edge 706 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 660. The object may be associated with a concept node 704 connected to a user node 702 of the first user by an edge 706. The first user may specify privacy settings that apply to a particular edge 706 connecting to the concept node 704 of the object, or may specify privacy settings that apply to all edges 706 connecting to the concept node 704. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 660 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 660 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 670, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 662 may be authorization/privacy servers for enforcing privacy settings. In response to a request from a user (or other entity) for a particular object stored in a data store 664, the social-networking system 660 may send a request to the data store 664 for the object. The request may identify the user associated with the request and the object may be sent only to the user (or a client system 630 of the user) if the authorization server determines that the user is authorized to access the object based on the privacy settings associated with the object. If the requesting user is not authorized to access the object, the authorization server may prevent the requested object from being retrieved from the data store 664 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 660, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 660 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 660 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 660 may access such information in order to provide a particular function or service to the first user, without the social-networking system 660 having access to that information for any other purposes. Before accessing, storing, or using such objects or information, the social-networking system 660 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 660.

In particular embodiments, a user may specify whether particular types of objects or information associated with the first user may be accessed, stored, or used by the social-networking system 660. As an example and not by way of limitation, the first user may specify that images sent by the first user through the social-networking system 660 may not be stored by the social-networking system 660. As another example and not by way of limitation, a first user may specify that messages sent from the first user to a particular second user may not be stored by the social-networking system 660. As yet another example and not by way of limitation, a first user may specify that all objects sent via a particular application may be saved by the social-networking system 660.

In particular embodiments, privacy settings may allow a first user to specify whether particular objects or information associated with the first user may be accessed from particular client systems 630 or third-party systems 670. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 660 may provide default privacy settings with respect to each device, system, or application, and/or the first user may be prompted to specify a particular privacy setting for each context. As an example and not by way of limitation, the first user may utilize a location-services feature of the social-networking system 660 to provide recommendations for restaurants or other places in proximity to the user. The first user's default privacy settings may specify that the social-networking system 660 may use location information provided from a client device 630 of the first user to provide the location-based services, but that the social-networking system 660 may not store the location information of the first user or provide it to any third-party system 670. The first user may then update the privacy settings to allow location information to be used by a third-party image-sharing application in order to geo-tag photos.

Privacy Settings for Mood or Sentiment Information

In particular embodiments, privacy settings may allow a user to specify whether mood or sentiment information associated with the user may be determined, and whether particular applications or processes may access, store, or use such information. The privacy settings may allow users to opt in or opt out of having mood or sentiment information accessed, stored, or used by specific applications or processes. The social-networking system 660 may predict or determine a mood or sentiment associated with a user based on, for example, inputs provided by the user and interactions with particular objects, such as pages or content viewed by the user, posts or other content uploaded by the user, and interactions with other content of the online social network. In particular embodiments, the social-networking system 660 may use a user's previous activities and calculated moods or sentiments to determine a present mood or sentiment. A user who wishes to enable this functionality may indicate in their privacy settings that they opt in to the social-networking system 660 receiving the inputs necessary to determine the mood or sentiment. As an example and not by way of limitation, the social-networking system 660 may determine that a default privacy setting is to not receive any information necessary for determining mood or sentiment until there is an express indication from a user that the social-networking system 660 may do so. By contrast, if a user does not opt in to the social-networking system 660 receiving these inputs (or affirmatively opts out of the social-networking system 660 receiving these inputs), the social-networking system 660 may be prevented from receiving, collecting, logging, or storing these inputs or any information associated with these inputs. In particular embodiments, the social-networking system 660 may use the predicted mood or sentiment to provide recommendations or advertisements to the user. In particular embodiments, if a user desires to make use of this function for specific purposes or applications, additional privacy settings may be specified by the user to opt in to using the mood or sentiment information for the specific purposes or applications. As an example and not by way of limitation, the social-networking system 660 may use the user's mood or sentiment to provide newsfeed items, pages, friends, or advertisements to a user. The user may specify in their privacy settings that the social-networking system 660 may determine the user's mood or sentiment. The user may then be asked to provide additional privacy settings to indicate the purposes for which the user's mood or sentiment may be used. The user may indicate that the social-networking system 660 may use his or her mood or sentiment to provide newsfeed content and recommend pages, but not for recommending friends or advertisements. The social-networking system 660 may then only provide newsfeed content or pages based on user mood or sentiment, and may not use that information for any other purpose, even if not expressly prohibited by the privacy settings.

Privacy Settings for User-Authentication and Experience-Personalization Information In particular embodiments, the social-networking system 660 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 660. The user's privacy settings may specify that such information may be used only for particular processes, such as authentication, and further specify that such information may not be shared with any third-party system 670 or used for other processes or applications associated with the social-networking system 660. As another example and not by way of limitation, the social-networking system 660 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 670 or used by other processes or applications associated with the social-networking system 660. As another example and not by way of limitation, the social-networking system 660 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system 670 or used by other processes or applications associated with the social-networking system 660.

User-Initiated Changes to Privacy Settings

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system 660 may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system 660 may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, the social-networking system 660 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system 660 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system 660 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system 660 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system 660 may send a reminder to the user to confirm his or her privacy settings every six months or after every ten photo posts. In particular embodiments, privacy settings may also allow users to control access to the objects or information on a per-request basis. As an example and not by way of limitation, the social-networking system 660 may notify the user whenever a third-party system 670 attempts to access information associated with the user, and require the user to provide verification that access should be allowed before proceeding.

Figure 8:
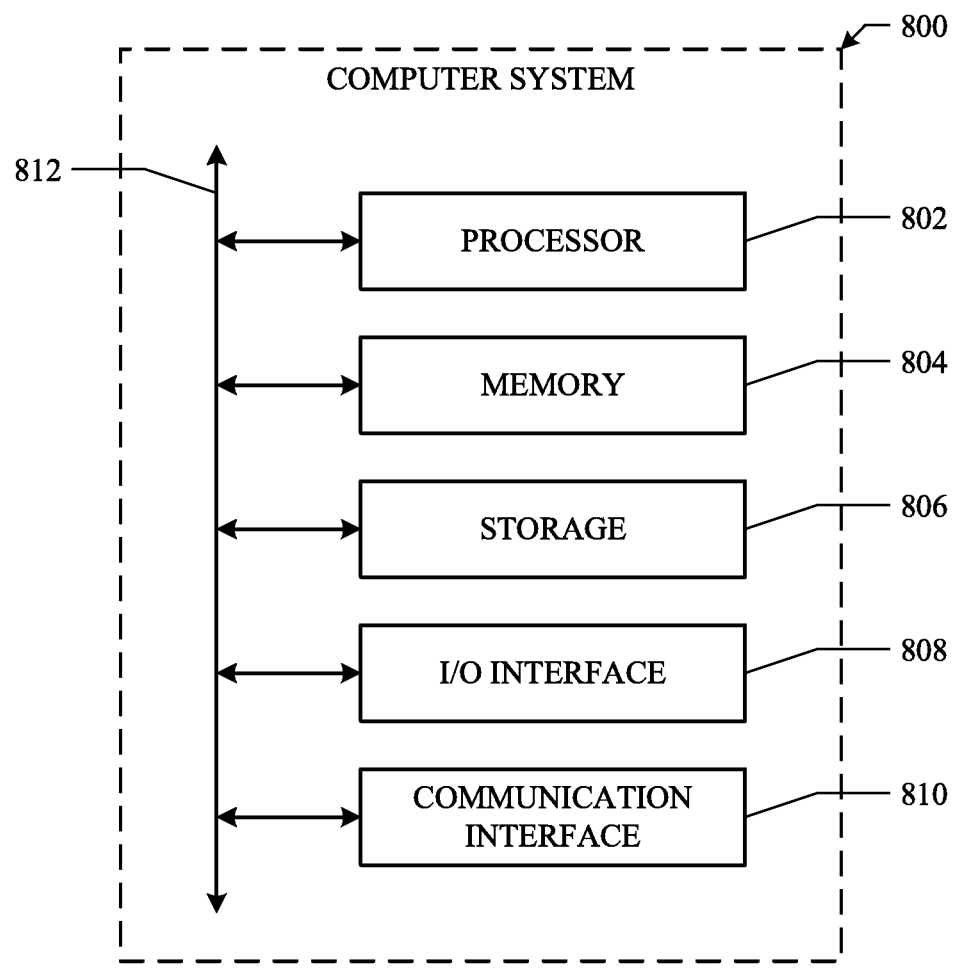
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    receiving, during an audio-video communication session, audio input data from a microphone array comprising at least two microphones, wherein the audio input data is generated by a first sound source at a first location within an environment and a second sound source at a second location within the environment;
    determining a first classification for the first sound source and a second classification for the second sound source;
    predicting a first engagement metric for the first sound source and a second engagement metric for the second sound source, wherein:
        the first engagement metric is based on the first classification and the second engagement metric is based on the second classification;
        the first engagement metric approximates an interest level of a receiving user for the first sound source; and
        the second engagement metric approximates an interest level from the receiving user for the second sound source;
    determining that the first engagement metric is greater than the second engagement metric;
    processing the audio input data to generate an audio output signal, wherein the audio output signal amplifies sound generated by the first sound source and attenuates sound generated by the second sound source; and
    sending the audio output signal to a computing device associated with the receiving user.

2. The method of claim 1, wherein the first classification for the first sound source is a human voice, and wherein the second classification for the second sound source is a non-human sound.

3. The method of claim 1, wherein the determining the first classification and the second classification is based on information received from a descriptive model for the audio-video communication session that comprises one or more descriptive characteristics about (1) an environment associated with the audio-video communication session; (2) one or more people within the environment, or (3) one or more contextual elements associated with the audio-video communication session.

4. The method of claim 1, wherein the processing the audio input data comprises acoustically beamforming a first audio input signal generated by the first source and a second audio input signal generated by the second source, wherein the acoustical beamforming comprises time delaying the second audio input signal such that the first sound source is amplified and the second sound source is attenuated.

5. The method of claim 1, wherein the first engagement metric and the second engagement metric are calculated based a descriptive model for the audio-video communication session that comprises one or more descriptive characteristics about (1) an environment associated with the audio-video communication session; (2) one or more people within the environment, or (3) one or more contextual elements associated with the audio-video communication session.

6. The method of claim 1, further comprising:
    accessing a social graph comprising a plurality of nodes and a plurality of edges connecting the nodes, wherein:
        a first node corresponds to the receiving user;
        a second node corresponds to an entity associated with the first sound source; and
        an edge between the first node and the second node represents a relationship between the receiving user and the entity; and
    increasing the first engagement metric based on the edge between the first node and the second node.

7. The method of claim 1, wherein the first engagement is calculated at least in part based on a count of words spoken by the first sound source, a distance between the first sound source and the microphone array, or an amount of time the first sound source has been present in the environment during the audio-video communication session; and
    the second engagement is calculated at least in part based on a count of words spoken by the second sound source, a distance between the second sound source and the microphone array, or an amount of time the second sound source has been present in the environment during the audio-video communication session.

8. A computer-readable non-transitory storage medium embodying software that is operable when executed to:
    receive, during an audio-video communication session, audio input data from a microphone array comprising at least two microphones, wherein the audio input data is generated by a first sound source at a first location within an environment and a second sound source at a second location within the environment;
    determine a first classification for the first sound source and a second classification for the second sound source;
    predict a first engagement metric for the first sound source and a second engagement metric for the second sound source, wherein:

the first engagement metric is based on the first classification and the second engagement metric is based on the second classification;
the first engagement metric approximates an interest level of a receiving user for the first sound source; and
the second engagement metric approximates an interest level from the receiving user for the second sound source;
determine that the first engagement metric is greater than the second engagement metric;
process the audio input data to generate an audio output signal, wherein the audio output signal amplifies sound generated by the first sound source and attenuates sound generated by the second sound source; and
send the audio output signal to a computing device associated with the receiving user.

9. The computer-readable non-transitory storage medium of claim 8, wherein the first classification for the first sound source is a human voice, and wherein the second classification for the second sound source is a non-human sound.

10. The media computer-readable non-transitory storage medium of claim 8, wherein the determining the first classification and the second classification is based on information received from a descriptive model for the audio-video communication session that comprises one or more descriptive characteristics about (1) an environment associated with the audio-video communication session; (2) one or more people within the environment, or (3) one or more contextual elements associated with the audio-video communication session.

11. The computer-readable non-transitory storage medium of claim 8, wherein the processing the audio input data comprises acoustically beamforming a first audio input signal generated by the first source and a second audio input signal generated by the second source, wherein the acoustical beamforming comprises time delaying the second audio input signal such that the first sound source is amplified and the second sound source is attenuated.

12. The computer-readable non-transitory storage medium of claim 8, wherein the first engagement metric and the second engagement metric are calculated based a descriptive model for the audio-video communication session that comprises one or more descriptive characteristics about (1) an environment associated with the audio-video communication session; (2) one or more people within the environment, or (3) one or more contextual elements associated with the audio-video communication session.

13. The computer-readable non-transitory storage medium of claim 8, wherein the software is further operable when executed to:
access a social graph comprising a plurality of nodes and a plurality of edges connecting the nodes, wherein:
a first node corresponds to the receiving user;
a second node corresponds to an entity associated with the first sound source; and
an edge between the first node and the second node represents a relationship between the receiving user and the entity; and
increase the first engagement metric based on the edge between the first node and the second node.

14. The computer-readable non-transitory storage medium of claim 8, wherein the first engagement is calculated at least in part based on a count of words spoken by the first sound source, a distance between the first sound source and the microphone array, or an amount of time the first sound source has been present in the environment during the audio-video communication session; and
the second engagement is calculated at least in part based on a count of words spoken by the second sound source, a distance between the second sound source and the microphone array, or an amount of time the second sound source has been present in the environment during the audio-video communication session.

15. A system comprising:
one or more processors; and
a computer-readable non-transitory storage medium coupled to one or more of the processors and comprising instructions operable when executed by one or more of the processors to cause the system to:
receive, during an audio-video communication session, audio input data from a microphone array comprising at least two microphones, wherein the audio input data is generated by a first sound source at a first location within an environment and a second sound source at a second location within the environment;
determine a first classification for the first sound source and a second classification for the second sound source;
predict a first engagement metric for the first sound source and a second engagement metric for the second sound source, wherein:
the first engagement metric is based on the first classification and the second engagement metric is based on the second classification;
the first engagement metric approximates an interest level of a receiving user for the first sound source; and
the second engagement metric approximates an interest level from the receiving user for the second sound source;
determine that the first engagement metric is greater than the second engagement metric;
process the audio input data to generate an audio output signal, wherein the audio output signal amplifies sound generated by the first sound source and attenuates sound generated by the second sound source; and
send the audio output signal to a computing device associated with the receiving user.

16. The system of claim 15, wherein the first classification for the first sound source is a human voice, and wherein the second classification for the second sound source is a non-human sound.

17. The system of claim 15, wherein the determining the first classification and the second classification is based on information received from a descriptive model for the audio-video communication session that comprises one or more descriptive characteristics about (1) an environment associated with the audio-video communication session; (2) one or more people within the environment, or (3) one or more contextual elements associated with the audio-video communication session.

* * * * *